US012781685B2

(12) United States Patent
Matsuura et al.

(10) Patent No.: US 12,781,685 B2
(45) Date of Patent: Nov. 3, 2026

(54) CONTROL DEVICE FOR INTERNAL COMBUSTION ENGINE

(71) Applicant: HONDA MOTOR CO., LTD., Tokyo (JP)

(72) Inventors: Katsuya Matsuura, Wako (JP); Kohtaro Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 19/063,412

(22) Filed: Feb. 26, 2025

(65) Prior Publication Data

US 2025/0305467 A1 Oct. 2, 2025

(30) Foreign Application Priority Data

Mar. 28, 2024 (JP) ................................ 2024-053407

(51) Int. Cl.

| | |
|---|---|
| ***B60T 7/12*** | (2006.01) |
| ***F02D 41/00*** | (2006.01) |
| ***F02D 41/40*** | (2006.01) |
| *F02D 41/38* | (2006.01) |

(52) U.S. Cl.

CPC ....... *F02D 41/402* (2013.01); *F02D 41/0025* (2013.01); *F02D 41/009* (2013.01); *F02D 2041/389* (2013.01); *F02D 2200/0414* (2013.01); *F02D 2200/0611* (2013.01)

(58) Field of Classification Search

CPC .. F02D 41/0025; F02D 41/064; F02D 41/402; F02D 19/084; F02D 2200/0611

USPC .......................................................... 701/103

See application file for complete search history.

(56) References Cited

U.S. PATENT DOCUMENTS

| | | | | |
|---|---|---|---|---|
| 9,909,523 | B1 * | 3/2018 | Glugla | F02D 41/047 |
| 10,087,860 | B2 * | 10/2018 | Surnilla | F02D 41/0007 |
| 10,260,443 | B2 * | 4/2019 | Hotta | F02D 41/0025 |
| 2018/0066598 | A1 * | 3/2018 | Dusa | F02D 41/3809 |
| 2019/0285016 | A1 * | 9/2019 | Surnilla | F02D 17/023 |

FOREIGN PATENT DOCUMENTS

| | | | |
|---|---|---|---|
| JP | 2009-121416 | 6/2009 | |
| WO | WO-2013171902 A1 * | 11/2013 | F02D 41/062 |

* cited by examiner

*Primary Examiner* — Logan M Kraft
*Assistant Examiner* — James J Kim
(74) *Attorney, Agent, or Firm* — Amin, Turocy & Watson, LLP

(57) ABSTRACT

Provided is a control device for a spark ignition internal combustion engine configured to directly inject alcohol-containing fuel into a cylinder, the control device for an internal combustion engine including a controller configured to control injection timing when the fuel is injected into the cylinder from a fuel injection device, an alcohol concentration detecting part configured to detect a content of alcohol contained in the fuel, and a crank angle detecting part configured to detect rotation of a crankshaft and output a crank angle signal and a top dead center signal, the controller executing split injection of splitting and injecting the fuel into an intake stroke and a compression stroke from the fuel injection device into the cylinder when a concentration of alcohol in the fuel is equal to or greater than a predetermined value.

6 Claims, 4 Drawing Sheets

CONTROL DEVICE FOR INTERNAL COMBUSTION ENGINE

CROSS-REFERENCE TO RELATED APPLICATION

Priority is claimed on Japanese Patent Application No. 2024-053407, filed Mar. 28, 2024, the content of which is incorporated herein by reference.

BACKGROUND OF THE INVENTION

Field of the Invention

The present invention relates to a control device for an internal combustion engine.

Description of Related Art

In the related art, efforts to mitigate or reduce the impact of climate change continue, and research and development is being conducted to reduce carbon dioxide emissions to achieve this goal.

In recent years, in spark ignition internal combustion engines (SI engines), in which fuel is injected directly into cylinders, attempts have been made to use alcohol-containing fuel as an alternative fuel to gasoline.

Japanese Unexamined Patent Application, First Publication No. 2009-121416 discloses a direct injection internal combustion engine configured to directly inject fuel into a combustion chamber. The internal combustion engine disclosed in Japanese Unexamined Patent Application, First Publication No. 2009-121416 includes a combustion chamber, an intake port and an exhaust port communicating with the combustion chamber, an intake valve and exhaust valve configured to freely open and close the intake port and the exhaust port, a fuel injection means capable of split injection of fuel into the combustion chamber from the side of the intake valve multiple times, and an injection period setting means configured to set a split injection period of the fuel using the fuel injection means during a cold operation to a first half side of an intake valve opening period in which the intake valve opens on the side of the combustion chamber.

SUMMARY OF THE INVENTION

Alcohols such as methanol, ethanol, and the like, generate less heat per unit volume compared to gasoline. For this reason, in the spark ignition internal combustion engine that uses fuel including alcohol, when the same output as the case in which the gasoline is used is obtained, the injection volume of the fuel injected into the cylinder needs to be increased compared to the case in which gasoline is used. In addition, alcohol is less likely to vaporize under low temperature conditions compared to gasoline. For this reason, in particular, when the internal combustion engine is operated under a low temperature environment using fuel that contains alcohol, the injection volume of the fuel injected into the cylinder is increased.

However, when the injection volume of the alcohol-containing fuel injected into the cylinder is increased, the fuel adhering to the inner wall of the cylinder flows down along an inner wall of the cylinder, and the amount of dilution (oil dilution amount) during mixing into the engine oil increases. When the dilution amount is too large, the engine oil may be diluted and the lubrication effect of the engine oil may decrease.

For this reason, in the spark ignition internal combustion engine in which alcohol-containing fuel is directly injected into the cylinder, it is required to suppress the amount of dilution that occurs during operation.

An aspect of the present application is directed to providing a control device for an internal combustion engine capable of suppressing an amount of dilution occurring during operation in a spark ignition internal combustion engine configured to directly inject alcohol-containing fuel into a cylinder.

An aspect of the present application provides the following means.

A control device for an internal combustion engine of a first aspect of the present invention is a control device for a spark ignition internal combustion engine (3) configured to directly inject alcohol-containing fuel into a cylinder (3*a*), the control device including: a controller (2) configured to control injection timing when the fuel is injected into the cylinder (3*a*) from a fuel injection device (4); an alcohol concentration detecting part (24) configured to detect a content of alcohol contained in the fuel; and a crank angle detecting part (21) configured to detect rotation of a crankshaft and output a crank angle signal and a top dead center signal, wherein the controller (2) executes split injection of injecting the fuel from the fuel injection device (4) into the cylinder (3*a*) by dividing the injection of the fuel into an intake stroke and a compression stroke when a concentration of alcohol in the fuel is equal to or greater than a predetermined value.

In the control device for an internal combustion engine of the first aspect, when the alcohol concentration in the fuel is equal to or greater than the predetermined value, the controller executes the split injection of injecting the fuel from the fuel injection device into the cylinder by dividing the injection of the fuel into the intake stroke and the compression stroke. For this reason, it is possible to sufficiently secure the output and suppress the dilution amount occurring due to operation of the spark ignition internal combustion engine configured to directly inject the alcohol-containing fuel into the cylinder.

According to a control device for an internal combustion engine of a second aspect of the present invention, in the first aspect, the controller (2) executes the split injection when the alcohol concentration in the fuel is equal to or greater than 90 volume %.

A difference in output between the case in which the alcohol-containing fuel is used and the case in which gasoline is used becomes more significant as the content of alcohol contained in the fuel increases. Accordingly, as the content of alcohol contained in the fuel increases, the greater the injection volume of the fuel is injected into the cylinder compared with the case in which gasoline is used. Accordingly, as the content of alcohol contained in the fuel increases, the amount of dilution that occurs during operation tends to become larger.

In the control device for an internal combustion engine of the second aspect, when the alcohol concentration in the fuel is equal to or greater than 90 volume %, the controller executes the split injection. For this reason, the effect of suppressing the dilution amount becomes more remarkable by performing the split injection. In addition, alcohol-containing fuel is preferable as an alternative fuel to gasoline when the alcohol concentration in the fuel is equal to or greater than 90 volume %.

According to a control device for an internal combustion engine of a third aspect of the present invention, in the first aspect, an ambient temperature detecting part (20) configured to detect an ambient temperature is provided, and the controller (2) executes the split injection when the ambient temperature is equal to or smaller than a predetermined value.

Alcohol is less likely to vaporize under low temperature conditions than gasoline. For this reason, when operating the internal combustion engine under a low temperature environment using the alcohol-containing fuel, the injection volume of the fuel injected into the cylinder is increased. Accordingly, when the internal combustion engine is operated under a low temperature environment, the amount of dilution generated during operation tends to be large.

In the control device for an internal combustion engine of the third aspect, the controller executes the split injection when the ambient temperature is equal to or smaller than the predetermined value. For this reason, the dilution amount that occurs when the internal combustion engine is operated under a low temperature environment can be suppressed, and the effect of suppressing the dilution amount becomes more remarkable.

According to a control device for an internal combustion engine of a fourth aspect of the present invention, in the third aspect, the ambient temperature detecting part (20) has an outside temperature detecting part (22) configured to detect a temperature of outside air suctioned into the cylinder (3*a*); and an engine water temperature detecting part (23) configured to detect a temperature of engine water, and the controller (2) executes the split injection when the temperature of the outside air and/or the engine water is equal to or smaller than a predetermined value.

In the control device for an internal combustion engine of the fourth aspect, the controller executes the split injection when the temperature of the outside air and/or the engine water is equal to or smaller than the predetermined value. For this reason, the effect of suppressing the amount of dilution occurring when the internal combustion engine is operated under a low temperature environment is likely to be more reliably obtained.

According to a control device for an internal combustion engine of a fifth aspect of the present invention, in the fourth aspect, the controller (2) executes the split injection when the temperature of the outside air and/or the engine water is within a range of 5° C. to −40° C.

When the internal combustion engine is operated under a low temperature environment in which the temperature of the outside air and/or engine water is equal to or smaller than 5° C., the alcohol-containing fuel is more likely to vaporize. For this reason, the injection volume of the alcohol-containing fuel injected into the cylinder may be increased. Accordingly, when the internal combustion engine is operated under a low temperature environment in which the temperature of the outside air and/or the engine water is equal to or smaller than 5° C., the amount of dilution that occurs during operation is likely to be greater.

In the control device for an internal combustion engine of the fifth aspect, the controller executes the split injection when the temperature of the outside air and/or the engine water is within a range of 5° C. to −40° C. For this reason, the effect of suppressing the amount of dilution occurring when the internal combustion engine is operated under a low temperature environment becomes more remarkable.

According to a control device for an internal combustion engine of a sixth aspect of the present invention, in the first aspect, ending of the fuel injection in the intake stroke is within a range of crank angle −300 deg. ATDC to −270 deg. ATDC, and ending of the fuel injection in the compression stroke is within a range of crank angle −90 deg. ATDC to −30 deg. ATDC. When the intake stroke and the compression stroke are within this range, by executing the split injection, the dilution amount can be further suppressed, and the injected fuel can be easily combusted completely, ensuring sufficient output.

According to a control device for an internal combustion engine of a seventh aspect of the present invention, in the first aspect, an engine water temperature detecting part configured to detect a temperature of engine water is provided, and the controller executes the split injection again when the temperature of the engine water after executing the split injection is equal to or smaller than a predetermined value.

As the controller executes the split injection, when the alcohol concentration in the fuel is equal to or greater than the predetermined value, the effect of suppressing the amount of dilution occurring during operation is obtained. However, when the temperature of the engine water in the internal combustion engine is high enough, it may be preferable for the controller to inject the fuel at a timing other than split injection in order to ensure better operating performance.

In the control device for an internal combustion engine of the seventh aspect, the controller executes the split injection again when the temperature of the engine water after executing the split injection is equal to or smaller than the predetermined value. For this reason, this effectively suppresses the amount of dilution that occurs when the engine is operated under a low temperature environment where the temperature of the engine water is equal to or smaller than the predetermined value, and when the temperature of the engine water is sufficiently high, it becomes easier to operate the engine under operating conditions that provide better performance.

In the control device of the present invention, the controller executes the split injection of injecting the fuel from the fuel injection device into the cylinder by dividing the injection of the fuel into the intake stroke and the compression stroke when the alcohol concentration in the fuel is equal to or greater than the predetermined value. For this reason, according to the control device of the present invention, it is possible to reduce the amount of dilution that occurs during operation of the spark ignition internal combustion engine configured to inject the alcohol-containing fuel directly into the cylinder, while still ensuring sufficient output.

DETAILED DESCRIPTION OF THE INVENTION

Figure 1:
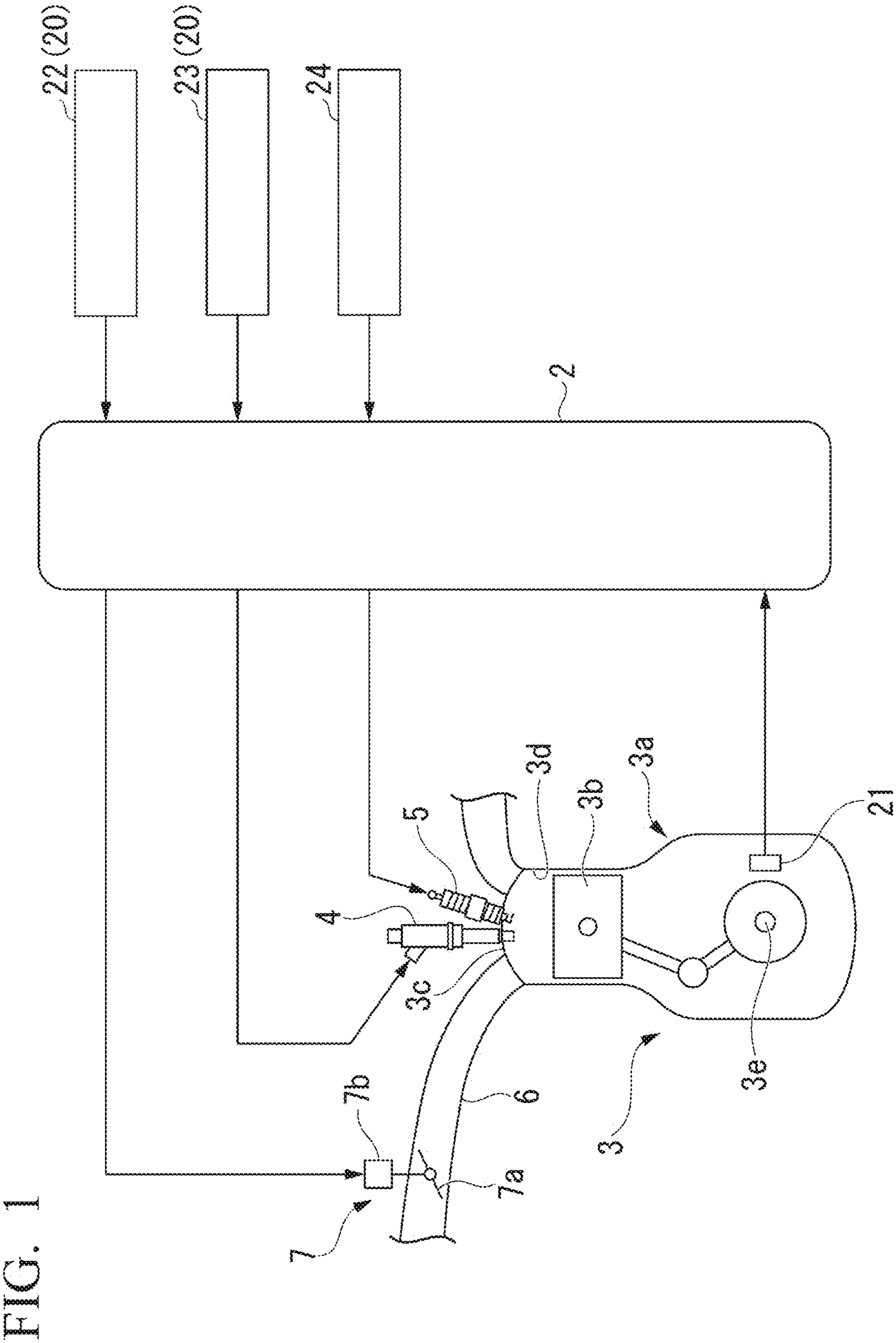
FIG. 1 is a schematic diagram for describing a control device for an internal combustion engine according to an embodiment and an internal combustion engine to which the control device is applied.

In order to reduce an amount of dilution generated by operating a spark ignition internal combustion engine in which alcohol-containing fuel is directly injected into a cylinder, the inventor(s) conducted extensive research focusing on a relationship between the dilution amount and output, and the timing of injecting the fuel into the cylinder, as shown below.

In general, in the spark ignition internal combustion engine configured to directly inject gasoline into a cylinder, fuel is injected at a timing that can reduce the amount of soot emitted during operation. On the other hand, compared to gasoline, alcohol generates a much smaller amount of soot during combustion, and the change in soot amount due to the timing of injecting alcohol into the cylinder is also small. Due to these unique characteristics of alcohol, in the spark ignition internal combustion engine in which alcohol-containing fuel is directly injected into the cylinder, the timing of fuel injection can be determined by prioritizing the suppression of dilution amount over the suppression of the amount of soot emitted during operation.

Here, through careful study, the inventor(s) investigated the relationship between the timing of injecting the alcohol-containing fuel into the cylinder and the dilution amount. As a result, it was found that the dilution amount is likely to be large when the timing of injecting alcohol-containing fuel is within a range of crank angle −270 deg. ATDC to −90 deg. ATDC, the dilution amount is likely to be larger when within a range of −240 deg. ATDC to −120 deg. ATDC, and in particular, the dilution amount is likely to be large when about −180 deg. ATDC.

Accordingly, in order to reduce the amount of dilution emitted during operation, fuel may be injected to avoid crank angles at which the dilution amount is likely to be large.

However, when alcohol-containing fuel is used, in order to obtain the same output as when using gasoline, it is necessary to inject a larger injection volume into the cylinder than when using gasoline. For this reason, when using alcohol-containing fuel, the fuel injection period is likely to be longer than when using gasoline and it is difficult to inject fuel while sufficiently avoiding crank angles at which the dilution amount is likely to be large. In addition, when the alcohol-containing fuel is injected while avoiding the crank angles at which the dilution amount is likely to be large, the output is decreased compared to the case in which the alcohol-containing fuel is injected at the crank angle at which the dilution amount is likely to be large.

Here, the inventor(s) focused on the period during which fuel is injected and conducted repeated investigations. As a result, it was found that when there are multiple fuel injection periods between the start of the intake stroke and the ending of the compression stroke, the amount of dilution that occurs during operation can be reduced compared to the case in which there is only one consecutive fuel injection period, regardless of the timing of fuel injection. This is presumably because when there are multiple fuel injection periods, the amount of fuel that reaches the inner wall of the cylinder is less than the case in which there is only one continuous fuel injection period.

Further, the inventor(s) investigated the timing of fuel injection when there were multiple periods during which alcohol-containing fuel was injected. As a result, the present invention was conceived by discovering that by performing split injection, in which fuel is injected into the cylinder from the fuel injection device by dividing the injection of the fuel into an intake stroke and a compression stroke, it is possible to suppress the dilution amount while maintaining the output close to that obtained when fuel is injected at a crank angle at which the dilution amount is likely to be large.

Hereinafter, the control device for an internal combustion engine of the embodiment will be described in detail with reference to the accompanying drawings as appropriate. The drawings used in the following description may show enlarged characteristic parts for the sake of convenience in order to make the features of the present invention easier to understand. Accordingly, the dimensional proportions of each component may differ from the actual ones. The materials, dimensions, and the like, exemplified in the following description are merely examples, and the present invention is not limited to them, and can be modified as appropriate within the scope that does not change the scope of the invention.

FIG. 1 is a schematic diagram for describing an internal combustion engine controlled by a control device for an internal combustion engine according to the embodiment, and the control device. In the embodiment, the case in which the control device for an internal combustion engine of the embodiment is applied as a control device configured to control an engine 3 shown in FIG. 1, which is an example of an internal combustion engine, will be exemplarily described.

The engine 3 (internal combustion engine) shown in FIG. 1 is a spark ignition internal combustion engine configured to directly inject alcohol-containing fuel into a cylinder 3*a*. The engine 3 can be mounted on, for example, a vehicle (not shown).

As the alcohol contained in the alcohol-containing fuel, for example, one or two or more alcohol selected from methanol, ethanol, propanol, butanol, and the like, is exemplified. Among the above, it is preferable that the alcohol contained in the alcohol-containing fuel is methanol and/or ethanol.

Methanol and ethanol have a lower heat generation amount per unit volume compared to gasoline, so the amount of fuel needs to be increased to obtain the same output as when gasoline is used. Meanwhile, methanol and ethanol generate less soot during combustion than gasoline. Taking advantage of this characteristic, when the alcohol contained in the alcohol-containing fuel is methanol and/or ethanol, a significant effect of suppressing the amount of dilution generated during operation can be obtained by controlling the engine 3 using the control device of the embodiment.

The alcohol-containing fuel may be either alcohol alone or contain both alcohol and non-alcoholic compounds. Compounds other than alcohol that may be contained in the alcohol-containing fuel include non-alcohol fuels such as gasoline or the like, impurities such as water or the like, and additives.

When the alcohol-containing fuel contains both alcohol and a non-alcohol compound, the alcohol concentration in the fuel is preferably 90 volume % or more, and more preferably 95 volume % or more.

The engine 3 is, for example, a 4-cylinder engine having four cylinders 3*a* (only one is shown in FIG. 1). A combustion chamber 3*d* is provided between a piston 3*b* and a cylinder head 3*c* of each of the cylinders 3*a*. The cylinder head 3*c* is provided with a fuel injection device 4 and an ignition plug 5 for each of the cylinders 3*a*. In the engine 3 shown in FIG. 1, fuel is directly injected into the cylinder 3*a* from the fuel injection device 4.

As shown in FIG. 1, the fuel injection device 4 and the ignition plug 5 are electrically connected to a controller 2 of the control device of the embodiment. The injection timing and injection volume of the fuel injected from the fuel injection device 4 into the cylinder 3*a*, and the ignition timing of the spark ignition of the fuel in the cylinder 3*a* are controlled by a control signal from the controller 2.

As shown in FIG. 1, an intake passage 6 is connected to the cylinder head 3*c* of each of the cylinders 3*a*. The intake passage 6 is provided with a throttle valve 7. The throttle valve 7 has a butterfly type valve body 7*a*, and an actuator 7*b* configured to drive the valve body 7*a*. The actuator 7*b* is electrically connected to the controller 2 and driven by a control signal from the controller 2. Accordingly, an opening angle of the valve body 7*a* is controlled, and a volume of air drawn into the cylinder 3*a* is controlled.

The control device of the embodiment includes a crank angle detecting part 21, an ambient temperature detecting part 20 configured to detect an ambient temperature, an alcohol concentration detecting part 24, and a cylinder pressure detecting part (not shown). As shown in FIG. 1, each of these detecting parts (sensors) is electrically connected to the controller 2. Output signals output from these detecting means are input to the controller 2.

In the embodiment, an outside temperature detecting part 22 and an engine water temperature detecting part 23 are provided as the ambient temperature detecting part 20. The control device of the embodiment may have both or any one of the outside temperature detecting part 22 and the engine water temperature detecting part 23 as the ambient temperature detecting part 20.

In addition, while the case in which the ambient temperature detecting part 20 is provided has been exemplarily described in the embodiment, the ambient temperature detecting part 20 (the outside temperature detecting part 22 and the engine water temperature detecting part 23) may not be provided.

The crank angle detecting part 21 detects rotation of a crankshaft 3*e* of the engine 3 and outputs a crank angle (CRK) signal and a top dead center (TDC) signal.

The outside temperature detecting part 22 detects a temperature of air flowing through the intake passage 6 as a temperature of outside air suctioned into the cylinder 3*a*.

The engine water temperature detecting part 23 detects a temperature of engine water, which is a temperature of cooling water that circulates in a cylinder block of the engine 3.

The alcohol concentration detecting part 24 detects an alcohol content contained in the fuel by a known method. The alcohol concentration detecting part 24 is installed in, for example, a pipeline configured to connect the fuel injection device 4 and a fuel tank (not shown).

The cylinder pressure detecting part (not shown) is installed in the cylinder 3*a* and detects a pressure in the cylinder 3*a* by a known method.

As the controller 2, for example, an electronic control unit (ECU) can be used. The controller 2 is configured by a microcomputer constituted by a CPU, a RAM, a ROM, an E2PROM, an I/O interface, and the like. The controller 2 executes various engine control processings according to a control program stored in the ROM on the basis of the signal or the like input from the detecting means (sensor).

The controller 2 calculates the output acquired by combusting the fuel on the basis of a change in pressure in the cylinder 3*a* detected by the cylinder pressure detecting part (not shown).

The controller 2 of the control device of the embodiment controls injection timing when fuel is injected into the cylinder 3*a* from the fuel injection device 4. When the alcohol concentration in the fuel is equal to or greater than a predetermined value, the controller 2 executes split injection of injecting fuel into the cylinder 3*a* from the fuel injection device 4 by splitting the injection of the fuel into the intake stroke and the compression stroke.

In the split injection executed by the controller 2, the period during which fuel is injected in the intake stroke may be one period only, or multiple periods. In addition, the period during which fuel is injected in the compression stroke may be one period or multiple periods.

The split injection executed by the controller 2 is preferably performed such that the ending of the fuel injection in the intake stroke is within a range of crank angle −300 deg. ATDC to −270 deg. ATDC, and the ending of the fuel injection in the compression stroke is within a range of crank angle −90 deg. ATDC to −30 deg. ATDC. When the ending of the fuel injection in the intake stroke is or before crank angle −270 deg. ATDC, the dilution amount can be suppressed.

When the ending of the fuel inject in the compression stroke is or after crank angle −90 deg. ATDC, the dilution amount can be suppressed.

The predetermined value of the alcohol concentration in the fuel in the embodiment can be determined according to a use of the engine 3 or the like as appropriate. In this embodiment, the predetermined value of the alcohol concentration in the fuel is preferably 90 volume % or more, which is the concentration at which it is likely to be necessary to increase the injection volume of the alcohol-containing fuel injected into the cylinder 3*a* and which is likely to increase the dilution amount, and more preferably 95 volume % or more, and thus, the higher the alcohol concentration, the better.

It is preferable that the controller 2 executes split injection when the alcohol concentration in the fuel is equal to or greater than the predetermined value and the ambient temperature is equal to or smaller than the predetermined value. This is because it can effectively suppress the amount of dilution that occurs when the engine 3 is operated under a low temperature environment.

The ambient temperature in this embodiment may be either the temperature of the outside air or the temperature of the engine water, or it may be both the temperature of the outside air and the temperature of the engine water.

When the ambient temperature in the embodiment is both the temperature of the outside air and the temperature of the engine water, the predetermined value of the temperature of the outside air and the predetermined value of the temperature of the engine water may be the same or different.

The predetermined value of the ambient temperature in the embodiment can be determined according to use of the engine 3 or the like as appropriate. The predetermined value of the ambient temperature in this embodiment is preferably 5° C. or less, which is the temperature at which it is likely to become necessary to increase the injection volume of the alcohol-containing fuel injected into the cylinder 3*a* and at which the dilution amount is likely to increase, or may be 0° C. or less. The lower limit of the predetermined value of the ambient temperature can be, for example, −40° C. or higher.

It is preferable that the controller 2 executes split injection again when the temperature of the engine water after executing the split injection is equal to or smaller than the predetermined value. In this case, this effectively suppresses the dilution amount, and when the engine water temperature is sufficiently high, it becomes easier to operate under operating conditions that provide better performance.

Next, control processing of the engine 3 by the control device of the embodiment will be described.

Figure 2:
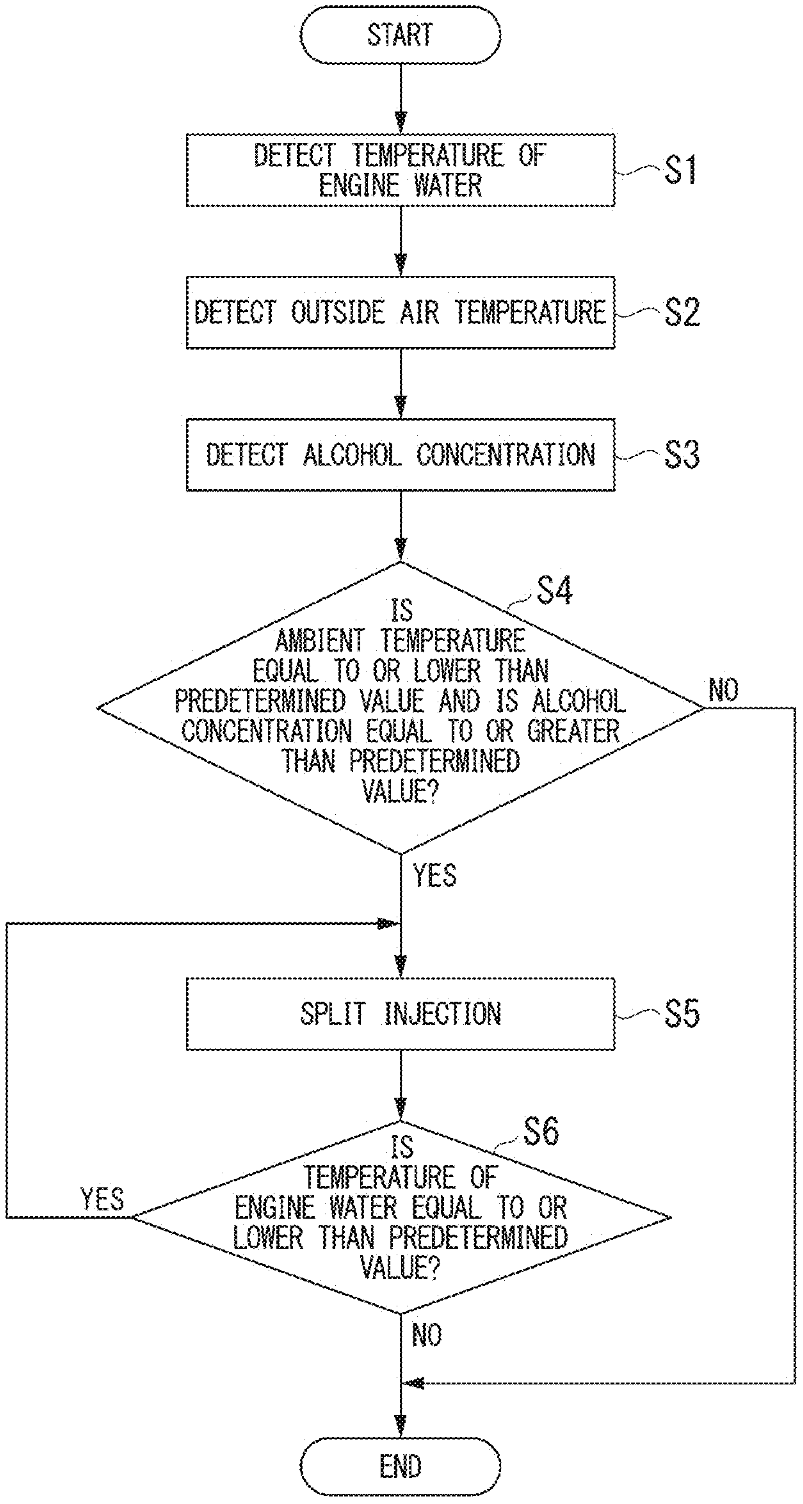
FIG. 2 is a flowchart for describing control processing of an engine 3 executed by the control device of the embodiment.

FIG. 2 is a flowchart for describing control processing of the engine 3 executed by the control device of the embodiment.

In the embodiment, first, the controller 2 causes the engine water temperature detecting part 23 to detect a temperature of engine water (step S1). Next, the controller 2 causes the outside temperature detecting part 22 to detect a temperature of outside air suctioned into the cylinder 3*a* (step S2). Next, the controller 2 causes the alcohol concentration detecting part 24 to detect alcohol content contained in the fuel (step S3).

Next, the controller 2 determines whether each of the temperature of the outside air, which is an ambient temperature, and the temperature of the engine water is equal to or lower than the predetermined value, and whether the alcohol concentration in the fuel is equal to or greater than the predetermined value (step S4).

Then, when it is determined that both the temperature of the outside air and the temperature of the engine water are equal to or smaller than the predetermined value and the alcohol concentration in the fuel is equal to or greater than the predetermined value, as shown in FIG. 2, the processing advances to step S5, and the controller 2 executes split injection of injecting the fuel into the cylinder 3*a* from the fuel injection device 4 by dividing the injection of the fuel into the intake stroke and the compression stroke (step S5).

Meanwhile, when any one or more of the following conditions is met: the temperature of the outside air exceeds the predetermined value, the temperature of the engine water exceeds the predetermined value, and the concentration of the alcohol in the fuel is less than the predetermined value (in other words, when any one or more of the temperature of the outside air, the temperature of the engine water, and the concentration of alcohol in the fuel are outside the specified numerical range), the control processing by the control device of this embodiment ends.

In step S5, it is preferable that the controller 2 executes the split injection when the temperature of the outside air and/or the engine water is within the range of 5° C. to −40° C.

In step S5, it is preferable that the controller 2 executes the split injection when the concentration of alcohol in the fuel is equal to or greater than 90 volume %.

It is preferable that the controller 2 executes the split injection in step S5 when it is determined that both the temperature of the outside air and the temperature of the engine water are equal to or lower than the predetermined value and the concentration of alcohol in the fuel is equal to or greater than the predetermined value in step S4.

In addition, it is preferable that the controller 2 executes the split injection in which the ending of the fuel injection in the intake stroke is within a range of crank angle −300 deg. ATDC to −270 deg. ATDC and the ending of the fuel injection in the compression stroke is within a range of crank angle −90 deg. ATDC to −30 deg. ATDC in step S5.

Here, the relationship between the timing of the fuel injection and the amount of dilution generated during operation of the spark ignition internal combustion engine configured to directly inject the alcohol-containing fuel into the cylinder will be described.

Figure 3:
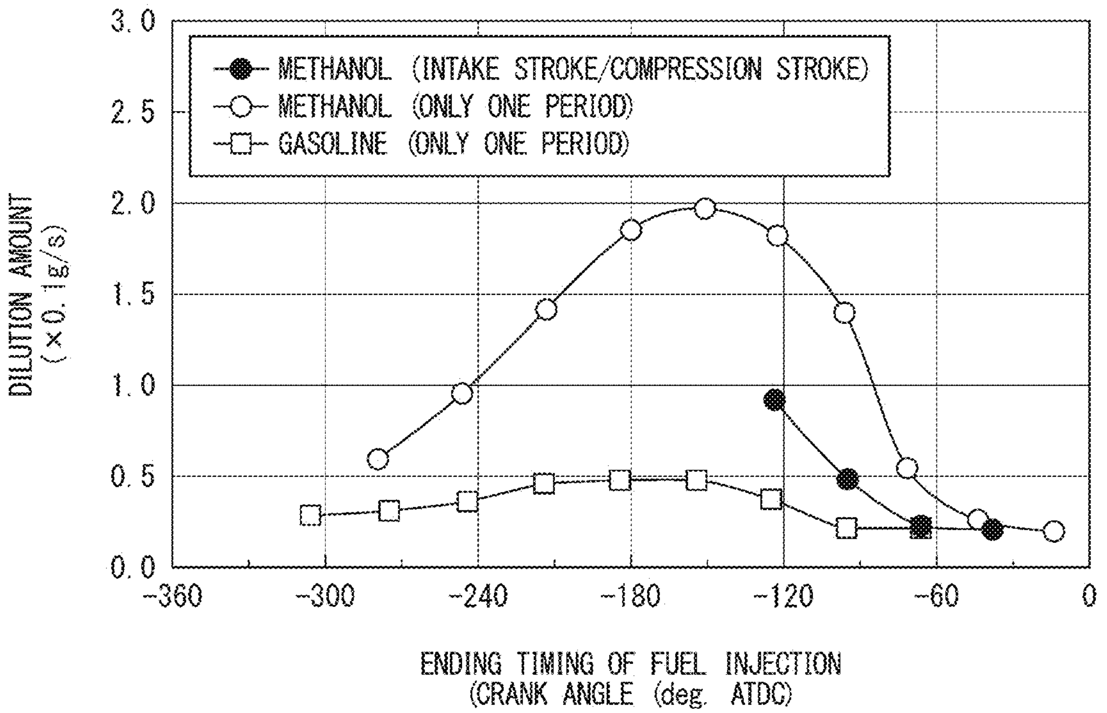
FIG. 3 is a graph showing a relationship between an ending timing (crank angle) of fuel injection and a dilution amount for methanol (only one period), gasoline (only one period), methanol (intake stroke, compression stroke).

FIG. 3 is a graph showing a relationship between the ending timing (crank angle) of the fuel injection and the dilution amount for methanol (only one period), gasoline (only one period), and methanol (intake stroke, compression stroke).

The methanol (only one period) and gasoline (only one period) in FIG. 3 is an example in which the fuel injection period is only one period. The methanol (only one period) and gasoline (only one period) in FIG. 3 was injected at an injection volume at which the heat generation amount in the cylinder becomes equal.

The methanol (intake stroke, compression stroke) in FIG. 3 is an example in which the fuel injection period is two periods of the intake stroke and the compression stroke. The methanol (intake stroke, compression stroke) was provided such that a total injection volume in the two periods is the same as in the injection volume of the injected fuel in the methanol (only one period). In addition, in the first and second periods (compression stroke), half the injection volume to be injected for each was injected.

The first period (intake stroke) in the methanol (intake stroke, compression stroke) is a period of crank angle −320 deg. ATDC to −290 deg. ATDC (the dilution amount of the period is not shown), and FIG. 3 shows only the dilution amount when the ending timing of the fuel injection in the second period (intake stroke) is changed.

FIG. 3 shows a result when the engine was operated under operating conditions of engine rotation number; 2500 rpm, intake pipe pressure; 80 kPa, engine water temperature; 40° C., and outside air temperature suctioned into cylinder; 25° C. As the fuel, only methanol or only gasoline was used. In addition, the dilution amount in FIG. 3 was measured by the method described below. A difference between the fuel injection volume per unit time and the fuel consumed by combustion was calculated as the dilution amount.

As shown in FIG. 3, in the methanol (only one period), compared to the gasoline (only one period), the dilution amount is larger and the change in dilution amount due to the timing of fuel injection is also large. Specifically, in the methanol (only one period), when the ending timing of the crank angle is within a range of −270 deg. ATDC to −90 deg. ATDC, the dilution amount is increased.

On the other hand, in the methanol (intake stroke, compression stroke), as shown in FIG. 3, when the ending of the fuel injection in the compression stroke is within the range of crank angle −120 deg. ATDC to −30 deg. ATDC, compared to the methanol (only one period), the dilution amount is remarkably decreased. Further, for the methanol (intake stroke, compression stroke), when the ending is within the range of crank angle −90 deg. ATDC to −30 deg. ATDC, the dilution amount is substantially the same as the gasoline (only one period).

Next, the relationship between the ending timing of the fuel injection (crank angle) and the amount of output and carbon monoxide when the engine is operated under the same operating conditions as in FIG. 3, except for the fuel injection volume, will be explained.

Figure 4:
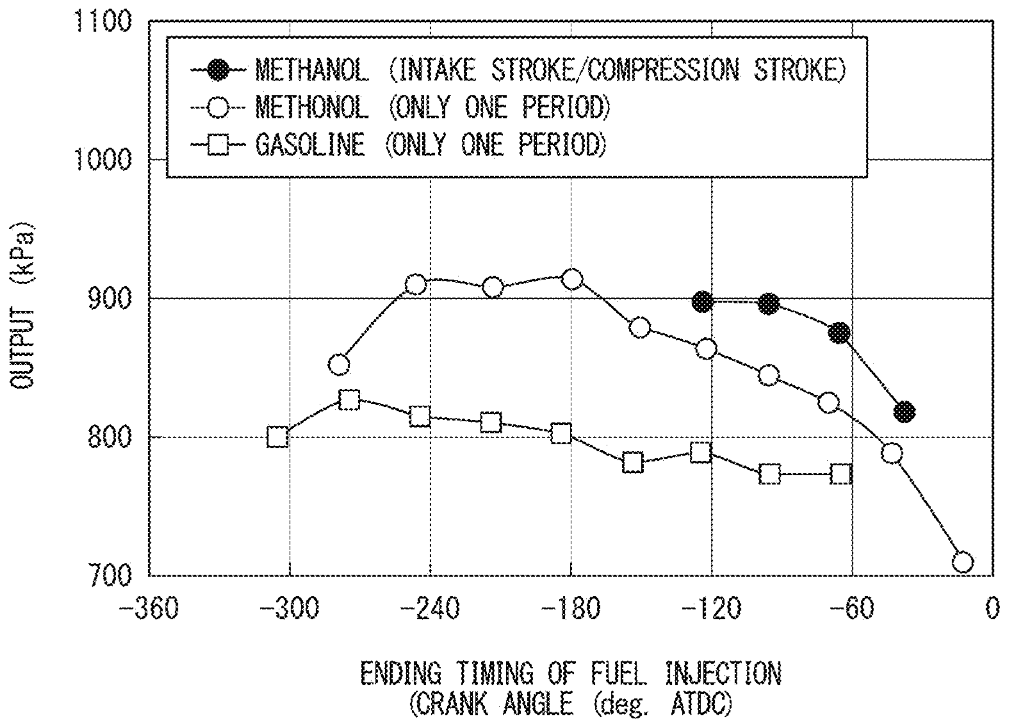
FIG. 4 is a graph showing a relationship between an ending timing (crank angle) of fuel injection and output for methanol (only one period), gasoline (only one period), methanol (intake stroke, compression stroke).

FIG. 4 is a graph showing a relationship between the ending timing (crank angle) of the fuel injection and the output for methanol (only one period), gasoline (only one period), and methanol (intake stroke, compression stroke). As for the results of methanol (intake stroke, compression stroke) in FIG. 4, as in FIG. 3, only the results when the ending timing of fuel injection in the second period (intake stroke) was changed are shown. The methanol (only one period) and gasoline (only one period) in FIG. 4 was injected at a fixed injection volume within a range in which the output is 700 kPa to 1000 kPa. In addition, in the methanol (intake stroke, compression stroke), the total injection volume in the two periods was the same as the injection volume of the injected fuel in the methanol (only one period). In addition, in the first period and the second period (compression stroke), half the injection volume to be injected was injected for each sample. In addition, the output in FIG. 4 was calculated on the basis of the change in pressure in the cylinder.

As shown in FIG. 4, in the gasoline (only one period), the change in output by the fuel injection period is small. On the other hand, in the methanol (only one period), as the ending of the fuel injection approaches a range from crank angle −150 deg. ATDC to 0 deg. ATDC, the output decreases. However, in the methanol (intake stroke, compression stroke), compared to the methanol (only one period), when the ending of the fuel injection is within the range of crank angle −120 deg. ATDC to −30 deg. ATDC, high output is obtained.

Figure 5:
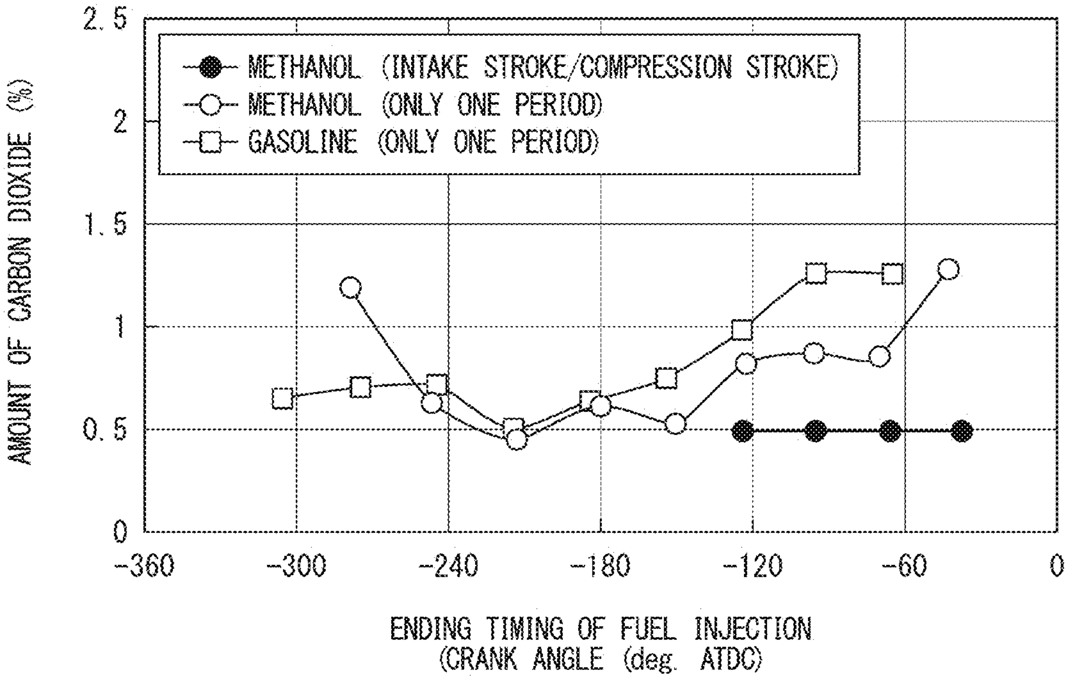
FIG. 5 is a graph showing a relationship between an ending timing (crank angle) of fuel injection and an amount of carbon monoxide for methanol (only one period), gasoline (only one period), methanol (intake stroke, compression stroke).

FIG. 5 is a graph showing a relationship between the ending timing (crank angle) of the fuel injection and the amount of carbon monoxide for methanol (only one period), gasoline (only one period), and methanol (intake stroke, compression stroke). As for the results of the methanol (intake stroke, compression stroke) in FIG. 5, like FIG. 3, only the results when the ending timing of the fuel injection in the second period (intake stroke) was changed are shown. The conditions of the injection volume of the fuel in FIG. 5 were the same as in FIG. 4. The amount of carbon monoxide in FIG. 5 was obtained by calculating the volume ratio of carbon monoxide contained in the total amount of gas exhausted from the engine.

As shown in FIG. 5, in the methanol (only one period) and methanol (intake stroke, compression stroke), compared to the gasoline (only one period), it can be seen that the amount of carbon monoxide is small, and the injected fuel tends to be easily completely combusted. In particular, within the range of crank angle −120 deg. ATDC to −30 deg. ATDC, the amount of carbon monoxide in the methanol (only one period) and methanol (intake stroke, compression stroke) is remarkably reduced compared to the gasoline (only one period). Further, in the methanol (intake stroke, compression stroke), compared to the methanol (only one period), the amount of carbon monoxide is reduced within the range of crank angle −120 deg. ATDC to −30 deg. ATDC.

From FIG. 3 to FIG. 5, it is estimated that when operating the spark ignition internal combustion engine that injects the alcohol-containing fuel directly into the cylinder using the control device of this embodiment, sufficient output can be secured and the dilution amount can be suppressed by performing the split injection, in which the fuel injection from the fuel injection device into the cylinder is divided into the intake stroke and the compression stroke.

On the other hand, for example, even when the second period is the intake stroke in the methanol (intake stroke, compression stroke) (in other words, when both the fuel injection periods are intake strokes), or even when the first period is the compression stroke (in other words, when both the fuel injection periods are compression strokes), the dilution amount is reduced compared to the methanol (only one period).

However, when the second period is the intake stroke in the methanol (intake stroke, compression stroke) or when the first period is the compression stroke, like the methanol (only one period), the output is decreased within the range of crank angle −120 deg. ATDC to −30 deg. ATDC in which the dilution amount can be suppressed (see FIG. 3 and FIG. 4). This is presumably due to the fact that the amount of carbon monoxide is large during the above-mentioned period (see FIG. 5), causing incomplete combustion of the injected fuel. Accordingly, in the case in which the second period is the intake stroke in the methanol (intake stroke, compression stroke) or the first period is the compression stroke, when the fuel is injected while avoiding the crank angle where the dilution amount is likely to be large, sufficient output cannot be secured.

Returning to FIG. 2, after executing step S5, the controller 2 determines whether the temperature of the engine water after performing the split injection is equal to or lower than the predetermined value (step S6). Then, when the temperature of the engine water after performing the split injection is equal to or smaller than the predetermined value, returning to step S5, the controller 2 executes the split injection again. Meanwhile, when the temperature of the engine water after performing the split injection exceeds the predetermined value, the control processing by the control device of the embodiment ends.

The predetermined value of the temperature of the engine water in step S6 may the same as the predetermined value of the temperature of the engine water in step S4, or may be a temperature exceeding the predetermined value of the temperature of the engine water in step S4. The predetermined value of the temperature of the engine water in step S6 may be within, for example, a range of 5° C. to −40° C.

In the control device of the embodiment, when the alcohol concentration in the fuel is equal to or greater than the predetermined value, the controller 2 performs the split injection of injecting the fuel from the fuel injection device 4 into the cylinder 3*a* by dividing the injection of the fuel into the intake stroke and the compression stroke. For this reason, according to the control device of the embodiment, it is possible to suppress the dilution amount occurring during operation of the spark ignition internal combustion engine configured to directly inject the alcohol-containing fuel into the cylinder 3*a* and secure the sufficient output.

In the above-mentioned embodiment, as shown in FIG. 2, while the example has been described in which step S1 to step S3 are executed in this order, the order of step S1 to step S3 is not particularly limited.

In addition, while the case in which the controller 2 determines whether the temperature of the outside air, which is the ambient temperature, and the temperature of the engine water are each equal to or lower than the predetermined value and determines whether the alcohol concentration in the fuel is equal to or greater than the predetermined value in step S4 has been exemplarily described in the above-mentioned embodiment, the controller may determine whether the alcohol concentration in the fuel is equal to or greater than the predetermined value. Accordingly, as shown in FIG. 2, although steps S1 to S3 may all be executed, it is sufficient to execute at least step S3, and step S1 and/or step S2 may not be executed.

In addition, in the above-mentioned embodiment, as shown in FIG. 2, although the case where step S6 is executed has been described as an example, the control processing may be ended without executing step S6. When the control processing is ended without executing step S6, the control processing of the engine 3 shown in FIG. 2 may be executed repeatedly.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A control device for an internal combustion engine that is a control device for a spark ignition internal combustion engine configured to directly inject alcohol-containing fuel into a cylinder, the control device comprising:

a controller configured to control an injection timing when the fuel is injected into the cylinder from a fuel injection device;

an alcohol concentration detecting part configured to detect a content of alcohol contained in the fuel; and a crank angle detecting part configured to detect rotation of a crankshaft and output a crank angle signal and a top dead center signal, wherein the controller executes split injection of injecting the fuel from the fuel injection device into the cylinder by dividing the injection of the fuel into an intake stroke and a compression stroke when a concentration of alcohol in the fuel is equal to or greater than a predetermined value, and wherein ending of the fuel injection in the intake stroke is within a range of crank angle −300 deg. ATDC to −270 deg. ATDC, and ending of the fuel injection in the compression stroke is within a range of crank angle −90 deg. ATDC to −30 deg. ATDC.

2. The control device for an internal combustion engine according to claim 1, wherein the controller executes the split injection when the alcohol concentration in the fuel is equal to or greater than 90 volume %.

3. The control device for an internal combustion engine according to claim 1, comprising an ambient temperature detecting part configured to detect an ambient temperature, wherein the controller executes the split injection when the ambient temperature is equal to or smaller than a predetermined value.

4. The control device for an internal combustion engine according to claim 3, wherein the ambient temperature detecting part has:

an outside temperature detecting part configured to detect a temperature of outside air suctioned into the cylinder; and an engine water temperature detecting part configured to detect a temperature of engine water, and the controller executes the split injection when the temperature of the outside air and/or the engine water is equal to or smaller than a predetermined value.

5. The control device for an internal combustion engine according to claim 4, wherein the controller executes the split injection when the temperature of the outside air and/or the engine water is within a range of 5° C. to −40° C.

6. The control device for an internal combustion engine according to claim 1, comprising an engine water temperature detecting part configured to detect a temperature of engine water, wherein the controller executes the split injection again when the temperature of the engine water after executing the split injection is equal to or smaller than a predetermined value.

* * * * *